(12) United States Patent
Yoon et al.

(10) Patent No.: US 9,253,538 B2
(45) Date of Patent: Feb. 2, 2016

(54) DISPLAY APPARATUS, APPARATUS FOR PROVIDING CONTENT VIDEO AND CONTROL METHODS THEREOF

(71) Applicant: SAMSUNG ELECTRONICS CO., LTD., Suwon-si (KR)

(72) Inventors: Yeo-ri Yoon, Cheongju-si (KR); Sang-hee Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 13/860,591

(22) Filed: Apr. 11, 2013

(65) Prior Publication Data

US 2013/0305283 A1    Nov. 14, 2013

(30) Foreign Application Priority Data

May 8, 2012    (KR) .......................... 10-2012-0048473

(51) Int. Cl.
| | |
|---|---|
| *H04N 21/4722* | (2011.01) |
| *H04N 21/431* | (2011.01) |
| *H04N 21/475* | (2011.01) |
| *H04N 21/4788* | (2011.01) |

(52) U.S. Cl.
CPC ....... *H04N 21/4722* (2013.01); *H04N 21/4316* (2013.01); *H04N 21/4756* (2013.01); *H04N 21/4788* (2013.01)

(58) Field of Classification Search
CPC .................................................... H04N 21/431
USPC ........................................................... 725/37
See application file for complete search history.

(56) References Cited

U.S. PATENT DOCUMENTS

| | | | |
|---|---|---|---|
| 2007/0250866 A1* | 10/2007 | Yamada | 725/58 |
| 2009/0265737 A1* | 10/2009 | Issa et al. | 725/38 |
| 2009/0293079 A1 | 11/2009 | McKee et al. | |
| 2011/0040760 A1 | 2/2011 | Fleischman et al. | |
| 2011/0107382 A1 | 5/2011 | Morris et al. | |
| 2011/0283311 A1* | 11/2011 | Luong | 725/28 |

FOREIGN PATENT DOCUMENTS

| | | |
|---|---|---|
| JP | 2007-274605 A | 10/2007 |
| KR | 10-2011-0023491 A | 3/2011 |
| KR | 10-2011-0042830 A | 4/2011 |

OTHER PUBLICATIONS

Communication from the European Patent Office issued May 22, 2014 in a counterpart European Application No. 13162377.9.

* cited by examiner

*Primary Examiner* — Jefferey Harold
*Assistant Examiner* — Justin Sanders
(74) *Attorney, Agent, or Firm* — Sughrue Mion, PLLC

(57) ABSTRACT

A display apparatus includes a display unit which displays a content video thereon; a communication unit which communicates with an external server providing a social networking service (SNS); and a controller which receives from the external server feedback information of a part of a playing section of the content video based on feedback information of a plurality of users with respect to the content video, the feedback information being collected through the SNS, and provides feedback information of a user regarding the part of the playing section while the content video is played.

12 Claims, 12 Drawing Sheets

DISPLAY APPARATUS, APPARATUS FOR PROVIDING CONTENT VIDEO AND CONTROL METHODS THEREOF

CROSS-REFERENCE TO RELATED APPLICATION

This application claims priority from Korean Patent Application No. 10-2012-0048473, filed on May 8, 2012 in the Korean Intellectual Property Office, the disclosure of which is incorporated herein by reference in its entirety.

BACKGROUND

1. Field

Apparatuses and methods consistent with the exemplary embodiments relate to a display apparatus which plays and displays a content video transmitted from the outside, an apparatus for providing a content video and control methods thereof, and more particularly, to a display apparatus, an apparatus for providing a content video and control methods thereof which provide various users' preferences, opinions and other information for a predetermined content video.

2. Description of the Related Art

A display apparatus processes an image signal, which is input from an external image supply source by various methods, and displays an image on a display panel, such as a liquid crystal display (LCD) panel, based on the processed image signal. A display apparatus which is provided to users may include a TV or a monitor. For example, a display apparatus which is realized as a TV may provide an image of a desired broadcasting channel by processing a broadcasting signal transmitted by transmission equipment of a broadcasting station through various processing operations such as tuning and decoding operations, or may receive a digital content video from a streaming server and display the video.

If the display apparatus receives a content video from a streaming server and displays the content video, the content video may have a large quantity of data due to various features, such as contents, type, resolution and picture quality. For example, if the content video is a movie, a normal playing time typically exceeds one hour. If the content video is a high-resolution and high-quality video, the data quantity increases relatively. Even if communication conditions for the display apparatus and the streaming server guarantee a fast transmission speed, a large content video causes various problems regarding downloading time from the streaming server to the display apparatus, communication traffic at the time of downloading the content video, a system load to the display apparatus and the streaming server due to the downloading, etc.

Thus, the streaming server additionally provides an image belonging to a part of an entire playing section of the content video, i.e., a preview image. Prior to the reception of the content video, the display apparatus receives the preview image of the content video and provides a user with the preview image to enable a user to determine whether to receive, play and display the content video in the display apparatus.

SUMMARY

Exemplary embodiments disclosed herein provide methods and apparatuses which improve upon the conventional techniques. The foregoing and/or other aspects may be achieved by providing a display apparatus including: a display unit which displays a content video thereon; a communication unit which communicates with an external server providing a social networking service (SNS); and a controller which receives from the external server feedback information of a part of a playing section of the content video based on feedback information of a plurality of users with respect to the content video, the feedback information being collected through the SNS, and provides feedback information of a user regarding the part of the playing section while the content video is played.

The controller may overlay the feedback information of the user on the content video corresponding to the part of the playing section if the display unit starts to display the part of the playing section.

The controller may receive a preview image of the content video that is generated based on the feedback information from the external server, and controls the display unit to display the received preview image on the display unit.

The preview image may be a playing section which is set based on a degree of distribution of playing sections corresponding to the feedback information of the plurality of users among the playing section of the content video.

The feedback information may include at least one from among preferences, opinions, content information and bookmark information of a predetermined playing section of the playing section of the content video.

The controller may control the display unit to display a user interface (UI) image which is provided to input the feedback information of the content video while the content video is played, and upon receiving the feedback information through the UI image in a predetermined playing section of the content video, may transmit to the external server the feedback information so that the external server stores the feedback information regarding the predetermined playing section at which the feedback information has been input.

The controller may be connected to the external server through a user account based on the SNS.

Another aspect may be achieved by providing a display apparatus including: a display unit which displays a content video thereon; a communication unit which communicates with an external server providing a social networking service (SNS); and a controller which is connected to the external server through the communication unit, receives a highlight image from the external server regarding a part of a playing section of the content video based on feedback information of a plurality of users with respect to the content video, the feedback information being collected through the SNS, and controls the display unit to display the received highlight image.

The controller may be connected to the external server through a web browser, and may control the display unit to display a web page for the external server to provide the content video and the highlight image.

Another aspect may be achieved by providing an apparatus for providing a content video including: a storage unit which stores a content video therein; a communication unit which is connected to a plurality of display apparatuses for communication based on a social networking service (SNS); and a controller which collects feedback information of a plurality of users regarding the content video from the plurality of display apparatuses, the feedback information being collected through the SNS, and provides one of the display apparatuses with the collected feedback information of the plurality of users together with the content video so that the display apparatus displays the feedback information of a user regarding a part of a playing section of the content video while the content video is played.

The controller may provide the display apparatus with information of the part of the playing section corresponding to the feedback information to overlay the feedback information on the content video if the display unit starts to display the part of the playing section.

The controller may generate a preview image of the content video based on the collected feedback information of the plurality of users and provides the display apparatus with the preview image.

The preview image may be a playing section which is set based on a degree of distribution of playing sections corresponding to the feedback information of the plurality of users among the playing section of the content video.

The feedback information may include at least one from among preferences, opinions, content information and bookmark information of a predetermined playing section of the playing section of the content video.

The display apparatus may be connected to the apparatus through a user account based on the SNS.

Another aspect may be achieved by providing an apparatus for providing a content video including: a storage unit which stores a content video therein; a communication unit which is connected to a plurality of display apparatuses for communication based on a social networking service (SNS); and a controller which collects feedback information of a plurality of users regarding the content video from the plurality of display apparatuses, the feedback information being collected through the SNS, generates a highlight image regarding a part of a playing section of the content video based on the collected feedback information and provides one of the display apparatuses with the generated highlight image to display the generated highlight image in the display apparatus.

The controller may provide the display apparatus with a web page providing the content video and the highlight image if the display apparatus is connected through a web browser.

Another aspect may be achieved by providing a control method of a display apparatus including: connecting to an external server providing a social networking service (SNS) for communication; receiving from the external server feedback information of a part of a playing section of a content video based on feedback information of a plurality of users, the feedback information being collected through the SNS; and providing feedback information of a user regarding the part of the playing section while the content video is played.

Another aspect may be achieved by providing a control method of a display apparatus including: connecting to an external server providing a social networking service (SNS) for communication; receiving from the external server a highlight image regarding a part of a playing section of a content video based on feedback information of a plurality of users, the feedback information being collected through the SNS; and displaying the received highlight image.

Another aspect may be achieved by providing a control method of an apparatus for providing a content video including: connecting to a plurality of display apparatuses for communication based on a social networking service (SNS); collecting feedback information of a plurality of users regarding a content video from the plurality of display apparatuses, the feedback information being collected through the SNS; and providing one of the display apparatuses with the collected feedback information of the plurality of users, together with the content video, to display the feedback information of a user regarding a part of a playing section while the content video is played.

Another aspect may be achieved by providing a control method of an apparatus for providing a content video including: connecting to a plurality of display apparatuses based on a social networking service (SNS) for communication; collecting feedback information of a plurality of users regarding a content video from the plurality of display apparatuses, the feedback information being collected through the SNS; and generating a highlight image regarding a part of a playing section of the content video based on the collected feedback information and providing one of the display apparatuses with the generated highlight image to display the generated highlight image in the display apparatus.

Another aspect may be achieved by providing a display apparatus, including: a display which displays a content video; a storage which stores a first user account of a social networking service (SNS); and a controller which receives, from a server, feedback information related to a portion of the content video and input to the server through a second user account of the SNS, and controls the display to display the feedback information based on the display displaying the portion of the content video.

BRIEF DESCRIPTION OF THE DRAWINGS

The above and/or other aspects will become apparent and more readily appreciated from the following description of the exemplary embodiments, taken in conjunction with the accompanying drawings, in which.

DETAILED DESCRIPTION OF EXEMPLARY EMBODIMENTS

Figure 1:
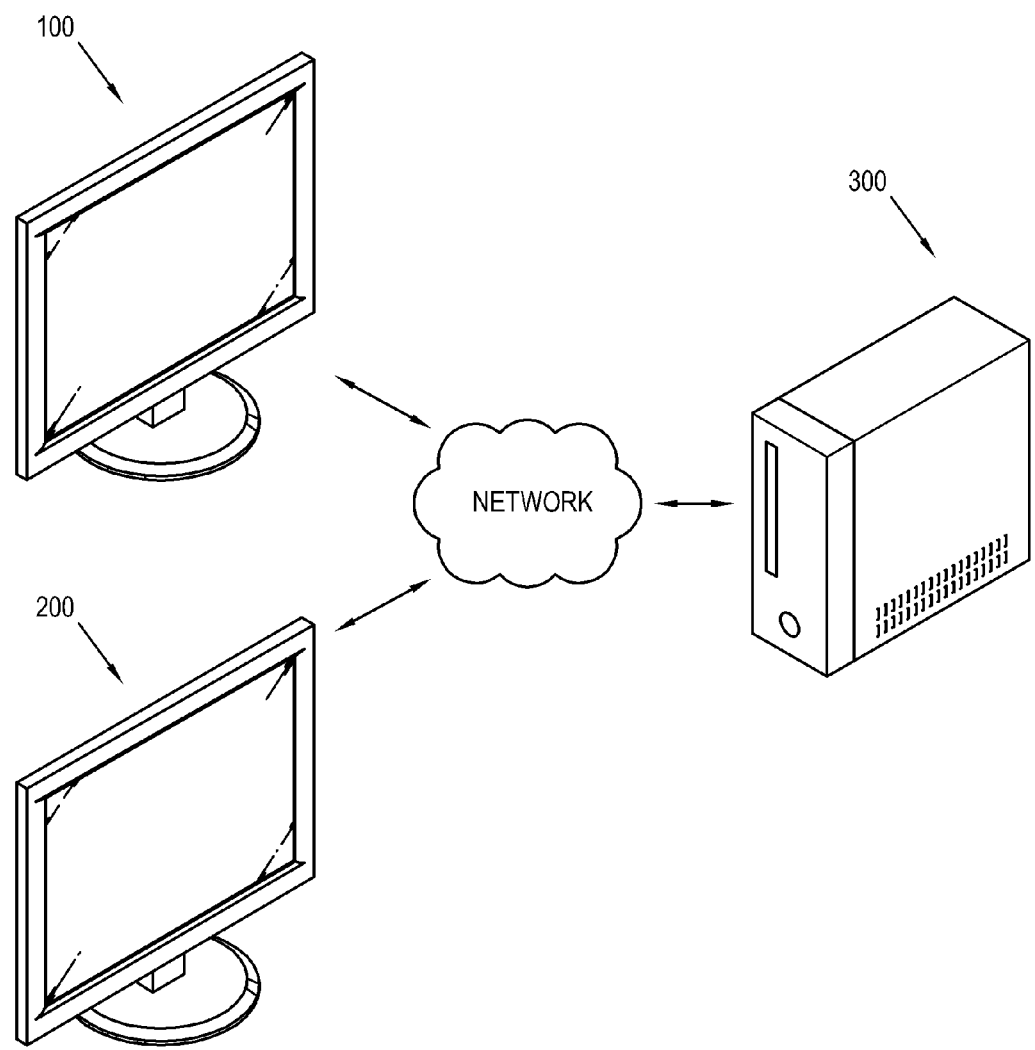
FIG. 1 illustrates an example of a display system according to an exemplary embodiment.

Below, exemplary embodiments will be described in detail with reference to accompanying drawings so as to be easily realized by a person having ordinary knowledge in the art. The exemplary embodiments may be embodied in various forms without being limited to the exemplary embodiments set forth herein. Descriptions of well-known parts are omitted for clarity, and like reference numerals refer to like elements throughout.

FIG. 1 illustrates an example of a display system according to an exemplary embodiment.

As shown therein, the display system is formed by a plurality of apparatuses 100, 200 and 300 which are each connected to one another through a wired and/or wireless network for mutual communication. The plurality of apparatuses 100, 200 and 300 of the display system includes a plurality of display apparatuses 100 and 200, and a server 300 which is connected to the display apparatuses 100 and 200 through a network.

The display apparatuses 100 and 200 are connected to the server 300 and receive various types of data/information therefrom. Such data/information are not limited in type, and may include, e.g., image data and voice data of various contents, or various additional data, such as guide and explanation information of the contents.

The display apparatuses 100 and 200 according to the present exemplary embodiment include, but are not limited to, TVs which process a broadcasting signal transmitted by transmission equipment of a broadcasting station, and display a broadcasting image based on the processed broadcasting signal. For example, the display apparatuses 100 and 200 may include various forms of apparatuses which may display an image based on image signals and/or image data transmitted from the outside (an external source), such as a portable multimedia player (PDP), a mobile phone, a network node, etc., and may communicate with the server 300.

The display apparatuses 100 and 200 may receive content video data from the outside, and process the content video data and display an image based on the processed content video data. To do the foregoing, the server 300 according to the present exemplary embodiment may provide the display apparatuses 100 and 200 with data of a digital content video at the request of the display apparatuses 100 and 200 via video on demand (VOD). It is understood that the data of the digital content video may be provided via sources other than VOD as well.

Upon request for contents through a network, the server 300 may provide a content video without limitations such as a selective response to the request, and without a specific authorization procedure. The server 300 may authorize a request for a content video from the display apparatuses 100 and 200 and determine whether to provide the content video according to the authorization result. The present exemplary embodiment relates to the latter case, which will be described below.

Figure 2:
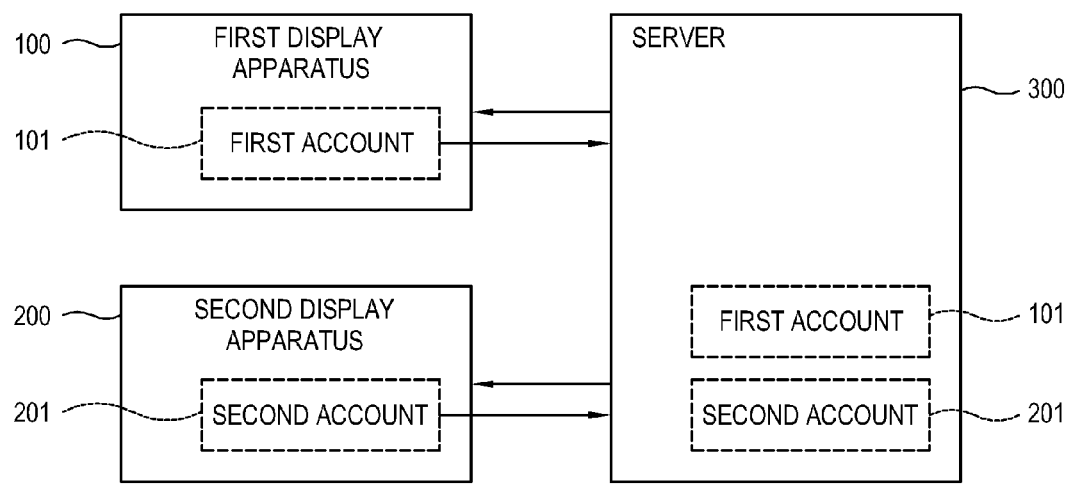
FIG. 2 illustrates an example of a method of connecting a display apparatus to a server in the display system in FIG. 1.

FIG. 2 illustrates an example of a method of connecting the display apparatuses 100 and 200 to the server 300.

As shown therein, the display apparatuses 100 and 200 include preset accounts 101 and 201, respectively. The accounts 101 and 201, which are user accounts, include information which specifies a profile of a user using the display apparatuses 100 and 200, including personal information of a user, environment information of the display apparatuses 100 and 200 set by the user, reception and playing history of content, and other various types of information related to usage history of the display apparatuses 100 and 200 and interaction information.

The user profile may include information which distinguishes a user using the display apparatuses 100 and 200 from other users, personal information of the user, or general information relating to a user, such as hobbies and preferred viewing contents. For example, the user profile may include an ID expressed in letters and numbers, a user's gender, age, address, or profession information, or a preferred broadcasting channel and broadcasting program information, although is not limited thereto.

The environment information of the display apparatuses 100 and 200 includes various types of information which are referred to or set for overall operations of the display apparatuses 100 and 200. For example, the display apparatuses 100 and 200 store therein a setting state of brightness, color temperature, picture quality or volume of a displayed image, or information related to entering an operation state such as a power-saving standby mode of the display apparatuses 100 and 200, as a default or as adjusted by a user. The display apparatuses 100 and 200 perform relevant operations according to stored information, i.e., according to the various types of environment information, for a user's convenience.

Interaction information includes various types of feature information which influences the display apparatuses 100 and 200 according to an interaction between a user and at least one of the display apparatuses 100 and 200. For example, a user may display an image of a particular channel selected by the user from a broadcasting channel list provided by the display apparatuses 100 and/or 200, and the display apparatuses 100 and/or 200 may store a history of the particular channel selected by the user, and provide the user with service based on the stored history when the user uses one of the display apparatuses 100 and/or 200 in the future.

The user profile, the environment information and interaction information of the display apparatuses 100 and 200 are correlative according to an embodiment feature.

That is, the accounts 101 and 201 may be designated individually or plurally for one of the display apparatuses 100 and 200. According to the present exemplary embodiment, for purposes of brief explanation, each of the display apparatuses 100 and 200 has a single account 101 and 201, respectively, designated thereto. Alternatively, if a plurality of accounts 101 and 201 is stored in and designated to one of the display apparatuses 100 and 200, a user may select one of the accounts 101 or 201.

Each of the accounts 101 and 201 includes an ID which combines various letters and numbers to be distinguished from the other accounts 101 and 201. Such accounts 101 and 201 are input in advance to the display apparatuses 100 and 200 by a user and stored in the display apparatuses 100 and 200, and the display apparatuses 100 and 200 are connected to the server 300 through the stored accounts 101 and 201 when the display apparatuses 100 and 200 are connected to the server 300.

Upon receiving account information of the display apparatuses 100 and 200 for connection, the server 300 authorizes the ID of the accounts 101 and 201. The server 300 stores therein various types of relevant information of the accounts 101 and 201. If the IDs of the accounts 101 and 201 correspond to the IDs of the accounts 101 and 201 stored in the server 300 at the time of requesting a connection, the server 300 determines that the display apparatuses 100 and 200 with the accounts 101 and 201 are connected to the server 300 and performs an authorization process for entering into a connectable mode.

If it is determined that the display apparatuses 100 and 200 are connected through their accounts 101 and 201, the server 300 may store operational history corresponding to the accounts 101 and 201 when performing a particular operation in response to a request through the accounts 101 and 201. That is, an interaction between the display apparatuses 100 and 200 and the server 300 is performed when the accounts 101 and 201 of the display apparatuses 100 and 200 are authorized by the server 300.

For example, a first account 101 of the first display apparatus 100 and a second account 201 of the second display apparatus 200 are distinguished from each other, and thus, the server 300 stores predetermined data corresponding to the first account 101 if the predetermined data are transmitted through the first account 101. Alternatively, upon receiving a request for a content video through the second account 201, the server 300 transmits the content video to the second display apparatus 200 having the second account 201, and stores a history of the request reception and transmission corresponding to the second account 201.

The accounts 101 and 201 may be correlative under various conditions, which are not limited in any way. For example, if the accounts 101 and 201 each include a user profile, users of the accounts 101 and 201 may be classified by various preset categories, such as family, regionalism, education, address, company, etc. These various preset categories may generally be referred to as a social networking service (SNS) in the network technology field, and are used to determine relevance between accounts, for example, relevance between the user profile of one of the accounts 101 and 201 to the other of the accounts 101 and 201.

According to such a principle, the server 300 classifies the accounts 101 and 201 by category to thereby determine whether the accounts 101 and 201 are correlative. The conditions for making such a determination may include, for example, friendship, colleagueship or regionalism.

In the foregoing example, each of the single display apparatuses 100 and 200 has a single account. However, each of the single display apparatuses 100 and 200 may alternatively have a plurality of accounts 101, 102 and 103. It is understood that the number of accounts designated to each display apparatus 100 and 200 is not limited in any way.

Figure 3:
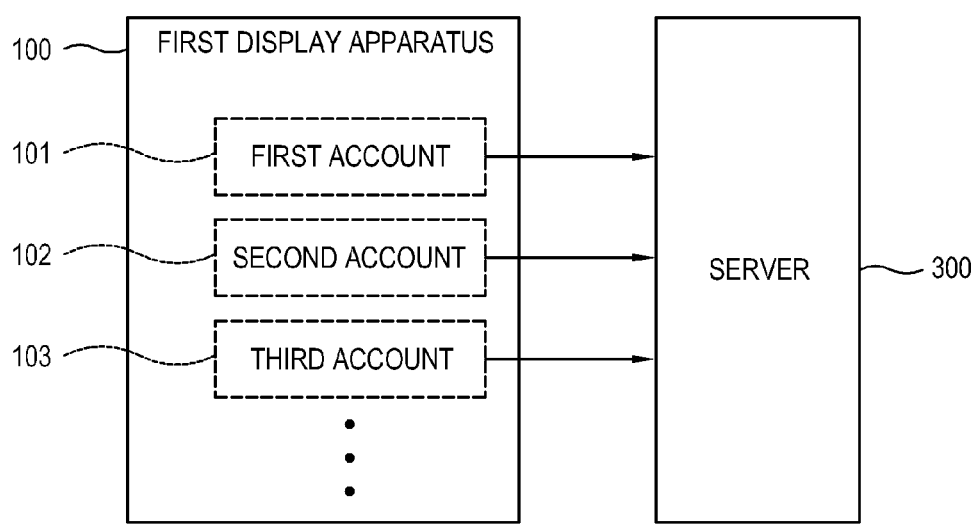
FIGS. 3 and 4 illustrate other examples of methods of connecting the display apparatus to the server in the display system in FIG. 1.

FIG. 3 illustrates another example of a method of connecting the first display apparatus 100 to the server 300.

As shown therein, the first display apparatus 100 may have a plurality of accounts 101, 102 and 103 including a first account 101, a second account 102 and a third account 103. One of the plurality of accounts 101, 102 and 103 is selected and the first display apparatus 100 is connected to the server 300 through the selected account. The account may be automatically selected from the plurality of accounts 101, 102 and 103 based on a designation as a default or may be selected from the plurality of accounts 101, 102 and 103 by a user.

If the first display apparatus 100 is connected to the server 300 through the selected account, the server 300 authorizes the account.

Furthermore, the accounts 101, 102 and 103 of the display apparatus 100 are not limited to being stored in the display apparatus 100, and may be stored in the server 300 connected to the display apparatus 100, rather than in the display apparatus 100.

Figure 4:
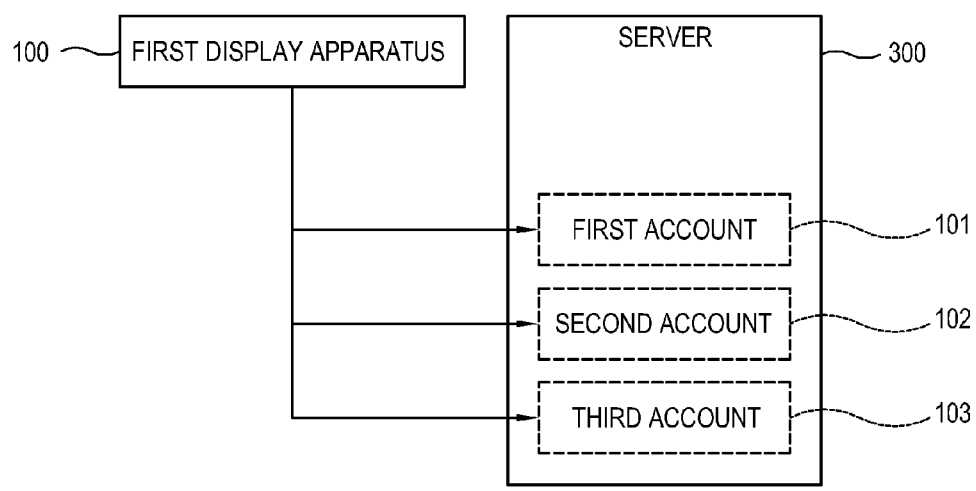

FIG. 4 illustrates another example of a method of connecting the first display apparatus 100 to the server 300.

As shown therein, the first display apparatus 100 does not store its own accounts 101, 102 and 103. The first display apparatus 100 is connected to the server 300 and is used to select one of the plurality of accounts 101, 102 and 103 stored in advance in the server 300. During the process, the first display apparatus 100 may perform an additional login/authorization process provided by the server 300 to be granted access to enable selection of one of the accounts 101, 102 and 103.

The plurality of accounts 101, 102 and 103 which is stored in the server 300 may not be limited to accounts of a single user, and may be accounts of a plurality of users, or a plurality of accounts of an identical user.

If the first display apparatus 100 is used to select one of the plurality of accounts 101, 102 and 103, the server 300 determines that the first display apparatus 100 has been connected to the server 300 through the selected account.

As described above, examples of methods of connecting the display apparatuses 100 and 200 to the server 300 through a preset account have been explained regarding the case where the accounts are stored in the display apparatuses 100 and 200, and the case where the accounts are stored in the server 300, but it is understood that other exemplary embodiments are not limited thereto. For example, any of these exemplary connection methods may be combined such that at least one account may be stored in a display apparatus 100 or 200 and at least one other account may stored in the server 300. Alternatively, an account or accounts may be stored in a component distinct from the display apparatuses 100 and 200 and the server 300.

Hereinafter, detailed configurations of the display apparatuses 100 and 200 and server 300 according to the present exemplary embodiment will be described with reference to FIG. 5. In the present exemplary embodiment, only the configuration of the first display apparatus 100 will be explained, and the second display apparatus 200 has substantially the same configuration as the first display apparatus 100 does. Thus, the second display apparatus 200 will not be explained in detail.

Figure 5:
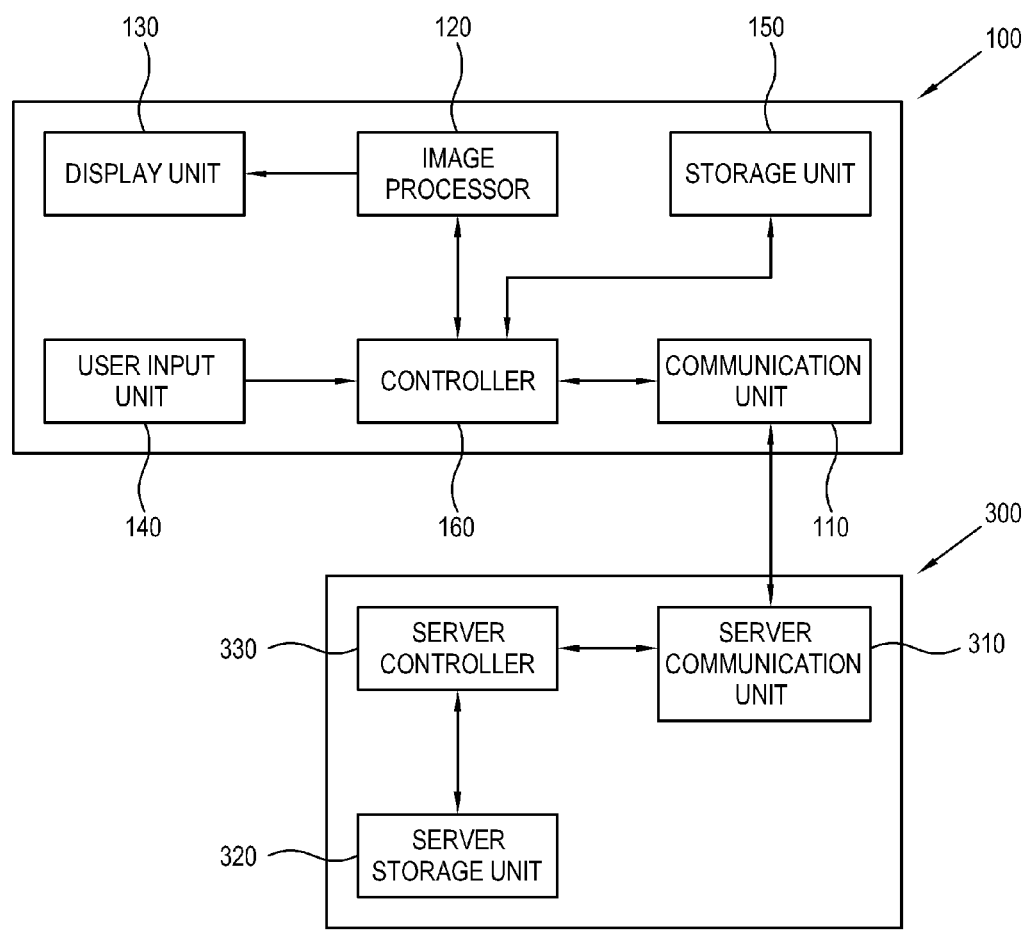
FIG. 5 is a block diagram of a first display apparatus and the server in FIG. 1.

FIG. 5 is a block diagram of the first display apparatus 100 and the server 300.

As shown therein, the first display apparatus 100 includes a communication unit 110 which communicates with the server 300 and transmits and receives various data/signals/information to/from the server 300, an image processor 120 which processes image data according to a preset image processing operation if the communication unit 110 receives the image data, a display unit 130 which displays an image thereon based on the image data processed by the image processor 120, a user input unit 140 which outputs a preset command/information according to a user's manipulation, a storage unit 150 which stores therein various types of data/information of the first display apparatus 100, and a controller 160 which controls various operations of the first display apparatus 100.

The server 300 includes a server communication unit 310 which communicates with the first display apparatus 100, a server storage unit 320 which stores therein various types of data/information of the server 300, and a server controller 330 which controls various operations of the server 300.

Hereinafter, a detailed configuration of the first display apparatus 100 will be described.

The communication unit 110 is connected to an external network according to preset wired and/or wireless communication protocol to enable the first display apparatus 100 to communicate with the server 300 connected in the same network. The communication unit 110 performs an interactive communication so that the controller 160 may transmit and receive predetermined data to/from the server 300. That is, the communication unit 110 transmits data of the first display apparatus 100 to the server 300 or transmits data from the server 300 to the controller 160 according to a control of the controller 160.

The type of data which may be received by the communication unit 110 is not limited. The communication unit 110 may receive image data of a content video from the server 300. In the present exemplary embodiment, only the case where the communication unit 110 receives image data will be explained, but the first display apparatus 100 may receive image data/image signals/image information not only through the communication unit 110 but also through other input units, which may be configured as hardware, software, or a combination thereof. For example, the first display apparatus 100 may further include an additional image receiver (not shown) to receive a radio frequency (RF) signal from a broadcasting station (not shown), or image signals according to various types of standards, such as, for example, high definition multimedia interface (HDMI), DisplayPort, unified display interface (UDI) or wireless HD standards, or may have the communication unit 110 receive the image signals according to these various types of standards.

The image processor 120 processes the image data received by the communication unit 110, through various preset image processing operations. The image processor 120 outputs the processed image data to the display unit 130, on which an image is displayed based on the processed image data.

The image processing operation performed by the image processor 120 may include at least one of a decoding operation corresponding to an image format of image data, a de-interlacing operation for converting interlaced image data into progressive image data, a scaling operation for adjusting image data into a preset resolution, a noise reduction operation for improving image quality, a detail enhancement operation, a frame refresh rate conversion operation, etc., but is not limited thereto.

The image processor 120 may be realized as a system-on-chip (SOC) which integrates the foregoing functions, or as an image processing board (not shown) which is formed by mounting individual elements which perform the foregoing operations individually, on a printed circuit board (PCB) (not shown) and is built in the first display apparatus 100.

The display unit 130 displays an image thereon based on processed image data output by the image processor 120. The display unit 130 may be realized as various types of display panels, including liquid crystal, plasma, light-emitting diode (LED), organic light-emitting diode (OLED), surface-conduction electron-emitter, carbon nano-tube, and nano-crystal, but is not limited thereto.

The display unit 130 may further include additional elements according to its embodiment type. For example, if the display unit 130 includes liquid crystal, the display unit 130 may further include an LCD panel (not shown), a backlight unit (not shown) which emits light to the LCD panel, and a panel driving substrate (not shown) which drives the panel.

The user input unit 140 transmits various preset control commands or various types of information to the controller 160 according to a user's manipulation and input. If a user inputs text information, handwriting information or image information through the user input unit 140, the user input unit 140 transmits the input information to the first display apparatus 100 so that the first display apparatus 100 may store therein the information or perform an operation corresponding to the information. For example, if a user profile is generated and stored in the first display apparatus 100, a user may input his/her personal information and signature through the user input unit 140 to store the input information in the first display apparatus 100. The user may access the user profile via the user input unit 140.

In an embodiment, the user input unit 140 is realized as a menu key and an input panel installed in an external side of the first display apparatus 100, or as a remote controller that is separated from the first display apparatus 100. Alternatively, the user input unit 140 may be formed integrally in the display unit 130. That is, if the display unit 130 includes a touch screen, a user may transmit a preset command to the controller 160 through an input menu (not shown) displayed on the display unit 130. The user input unit 140 may further be implemented as a combination of these types, or in other ways as well.

The storage unit 150 stores therein various types of data according to a control of the controller 160. In an embodiment, the storage unit 150 is realized as a non-volatile memory, such as a flash memory or a hard disc drive, which does not lose stored data even upon a power-off of the first display apparatus 100, although is not limited thereto. The storage unit 150 is accessed by the controller 160, and data stored in the storage unit 150 are read/recorded/modified/deleted/updated by the controller 160.

The controller 160 controls various operations performed within the first display apparatus 100. For example, to display an image, the controller 160 logs in the server 300 through the account of the first display apparatus 100 stored in the storage unit 150. While logged in through the account, the controller 160 may request a predetermined content video to the server 300. If the server 300 transmits a content video, the controller 160 transmits the received content video to the image processor 120 to thereby display an image on the display unit 130.

Hereinafter, a detailed configuration of the server 300 will be described.

The server communication unit 310 performs an interactive communication with the first display apparatus 100 through a network, such as, for example, a LAN, the Internet, a combination thereof, etc. To make the foregoing communication, the server communication unit 310 is connected to the network according to a preset communication protocol. The server communication unit 310 transmits the data received from the first display apparatus 100 via the network to the server controller 330, and transmits data stored in the server storage unit 320 to the first display apparatus 100 according to a control of the server controller 330.

The server storage unit 320 stores therein various types of data according to a control of the server controller 330, and includes, for example, a non-volatile memory. The server storage unit 320 is accessed by the server controller 330, and data stored in the server storage unit 320 are read/recorded/modified/deleted/updated by the server controller 330.

The server controller 330 controls various operations of the server 300. For example, upon receiving a request from the first display apparatus 100 through the account, the server controller 330 selectively approves the login by comparing the account with the account information stored in the server storage unit 320. Upon receiving a request for content from the first display apparatus 100, the server controller 330 selects content corresponding to the request among various types of content stored in the server controller 320 and transmits the content to the first display apparatus 100.

Alternatively, upon receiving predetermined data from the first display apparatus 100, the server controller 330 may store or update the data corresponding to the account of the first display apparatus 100.

With the foregoing configuration, according to the present exemplary embodiment, a user receives feedback information from his/her friends or acquaintances regarding content which may be provided by the server 300, thereby improving reliability in the selection of the content and understanding of the content.

More specifically, if the first display apparatus 100 is connected to the server 300, the server 300 transmits to the first display apparatus 100 feedback information of a part of an entire playing section of content (e.g., a video) based on feedback information of a plurality of users with respect to the content collected by using the SNS. The first display apparatus 100 transmits feedback information of the plurality of users altogether with respect to the part of the entire playing section while the content is played. Such feedback information may be overlaid on the content (e.g., the video) which is currently displayed.

Hereinafter, an exemplary embodiment will be described in more detail with reference to the drawings. In the present exemplary embodiment, feedback information is input through the second display apparatus 200 and the first display apparatus 100 displays a preview image based on the feedback information. However, this is an example explaining the present exemplary embodiment, and does not limit the exemplary embodiments in any way. The first display apparatus 100 and the second display apparatus 200 are named to distinguish a plurality of display apparatuses 100 and 200, and operations of displaying a content video, inputting feedback information and displaying a preview image may be performed by any of the display apparatuses 100 and 200.

Transmission of feedback information of a content video 410 to the server 300 by the second display apparatus 200 will be described with reference to FIG. 6.

Figure 6:
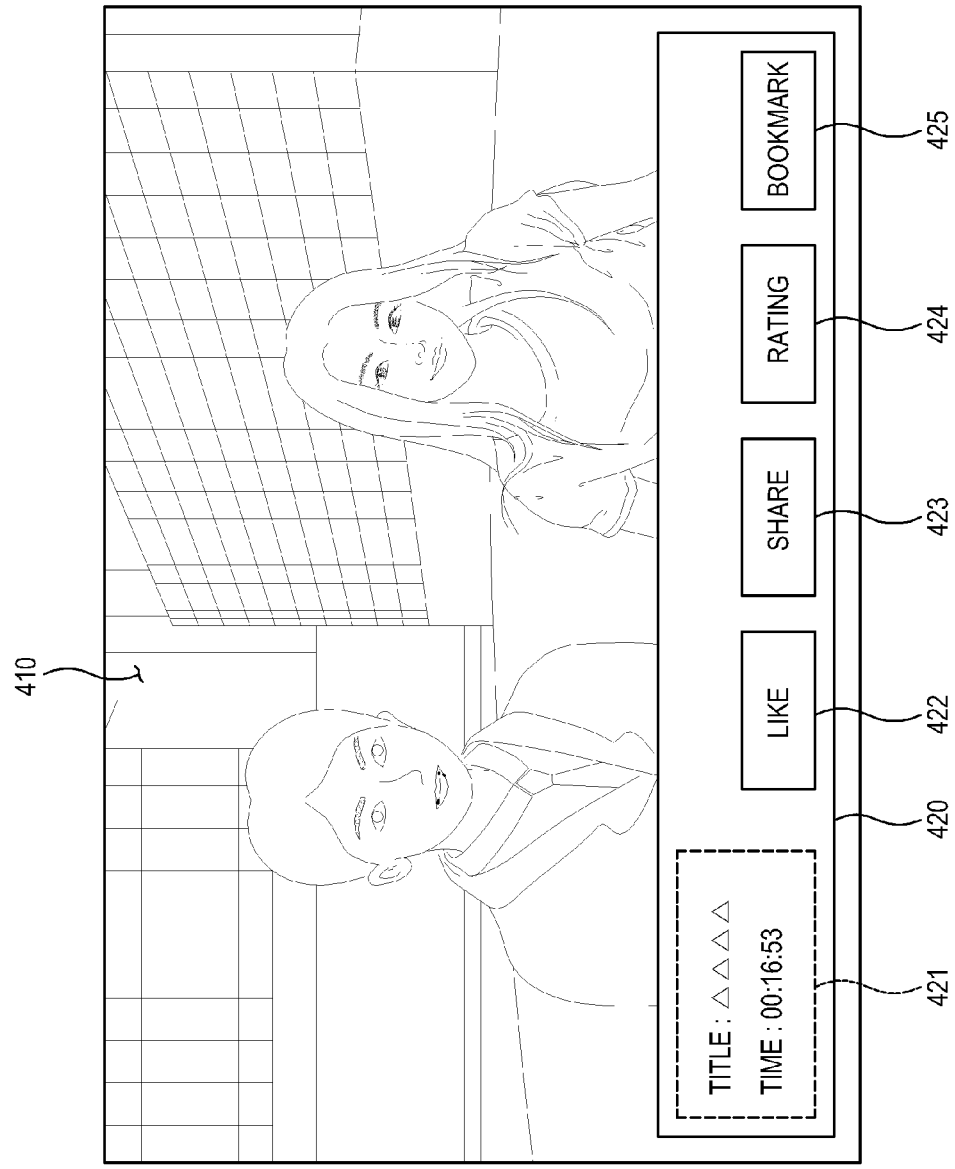
FIG. 6 illustrates an example of a user interface (UI) image which is displayed in a second display apparatus in FIG. 1 and provided to input feedback information.

FIG. 6 illustrates an example of a user interface (UI) image of a content video 410 which is displayed in the second display apparatus 200 to input feedback information.

As shown therein, the second display apparatus 200 transmits a request for a content video 410 to the server 300 while being logged in the server 300 through a second account. The second display apparatus 200 receives the content video 410 from the server 300 and displays the content video 410.

While the content video 410 is displayed, the second display apparatus 200 displays a UI image 420 to input feedback information corresponding to a preset event. The preset event may occur in various ways, e.g., the UI image 420 may be displayed when a user clicks a particular button (not shown) of the user input unit 140 of the second display apparatus 200. Upon occurrence of such an event, the second display apparatus 200 may display the UI image 420 at any playing time including the time when the content video 410 is played and displayed. Alternatively, the UI image 420 may also be displayed according to various other preset events, e.g., a predetermined passage of time, etc.

The UI image 420 is overlaid on the content video 410 or pops up. The UI image 420 includes content-related information 421 which explains the currently-played content, and various objects 422, 423, 424 and 425 which are provided to input feedback information.

The content-related information 421 includes a title, a current playing section (e.g., chapter) or playing time, and a brief explanation of a current scene of the content. The content-related information 421 may further include various types of information relating to the content video 410.

The objects 422, 423, 424 and 425 are provided to input feedback information corresponding to a current playing timing of the content video 410. The feedback information includes, but is not limited to, a user's preferences and opinions on the content video 410, and more specifically, on the content at the current timing regarding the content video 410. A user may input feedback information corresponding to the current playing timing of the content video 410 through the objects 422, 423, 424 and 425.

For example, the objects 422, 423, 424 and 425 are realized as click buttons (also referred to as buttons) having labels "Like" 422, "Share" 423, "Rating" 424 and "Bookmark" 425, and feedback information may be input by clicking at least one of the objects 422, 423, 424 and 425. Clicking on the foregoing objects 422, 423, 424 and 425 is one of various methods for inputting feedback information. The content and input configuration of the feedback information are not limited to the foregoing example.

The Like button 422 is provided to input a user's preference to a current scene of the content video 410. A user may click the Like button 422 if he/she likes the current scene.

The Share button 423 is provided to input a user's opinion on a scene. If the Share button 423 is clicked, an input window (not shown) may be additionally displayed for a user to input his/her opinion on the scene.

The Rating button 424 is provided to input a user's preference to a scene. If the Rating button 424 is clicked, several levels of preferences are displayed and a user may select one of the levels.

The Bookmark button 425 is flag information indicating a timing at which a scene is played and a user may replay the content video 410 from the timing indicated by the Bookmark 425.

The UI image 420 may be displayed repeatedly at various playing timings of the content video 410, rather than at only a single playing timing.

The feedback information which is input to the second display apparatus 200 in the foregoing various ways is transmitted by the second display apparatus 200 to the server 300.

The server 300 stores therein feedback information provided by the second display apparatus 200 with respect to the second account through which the second display apparatus 200 is currently connected to the server 300. The server 300 stores therein the feedback information corresponding to the playing timing of the content video 410, e.g., an input timing of the feedback information. That is, the server 300 stores therein the feedback information input through the second account, together with the playing timing information of the feedback information of the content video 410.

The server 300 can receive feedback information from various display apparatuses, including, for example, the second display apparatus 200, and stores therein the feedback information. The server 300 may provide the display apparatuses 100 and 200 with the stored feedback information in various manners.

The server 300 may provide the first display apparatus 100 with the content video, together with the feedback information collected from various users, as explained above.

Figure 7:
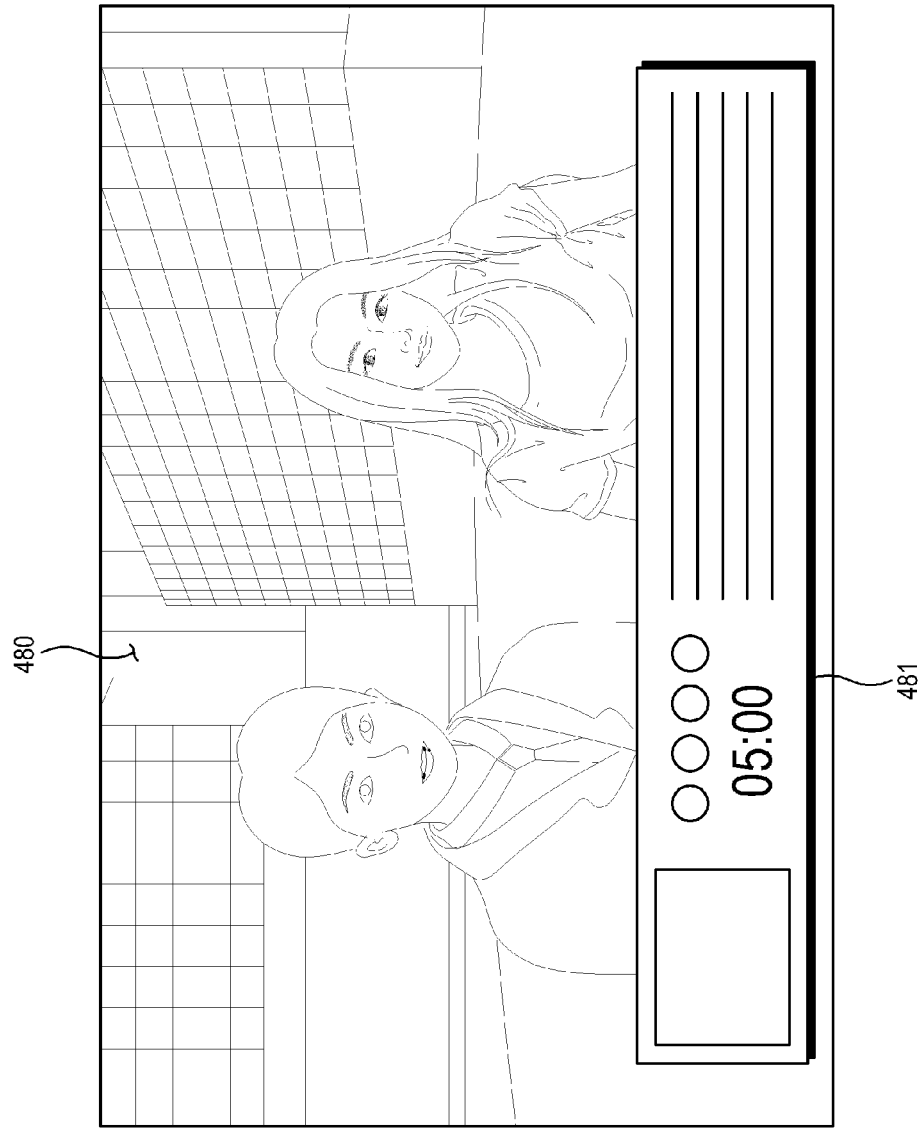
FIG. 7 illustrates an example of a content video which is displayed by the first display apparatus in FIG. 1.

FIG. 7 illustrates an example of a content video 480 which is displayed in the first display apparatus 100.

As shown therein, the first display apparatus 100 transmits a request for the content video 480 to the server 300 while being connected to the server 300 through the first account. The first display apparatus 100 receives the content video 480 from the server, and plays and displays the content video 480. The server 300 transmits the stored feedback information together with the content video 480, to the first display apparatus 100.

The feedback information includes information of an input playing section (e.g., chapter of a content video) or playing timing (e.g., 5 minutes elapsed playing time of the content video) of the entire playing section of the content video 480, and the first display apparatus 100 may determine a corresponding playing section of the feedback information in the entire playing section of the content video 480.

If there is feedback information corresponding to a predetermined first playing section or first playing timing, the first display apparatus 100 displays a feedback information image 481 corresponding to the first playing section or the first playing timing when the content video 480 arrives at the first playing section or the first playing timing while the content video 480 is displayed.

Information which is included in the feedback information image 481 may include feedback information input through an account of a display apparatus at a certain playing section or playing timing of a content video. For example, the feedback information image 481 may include ID or profile information of a user who previously input the feedback information, and/or an opinion and/or preferences previously input by the user.

That is, the first display apparatus 100 may display feedback information corresponding to each playing section while the content video 480 is played so that a user may identify feedback information of another account regarding a scene or scenes displayed at each of the playing sections. Also, a user may select feedback information of another account which relates to his/her account based on the SNS to thereby improve reliability of the feedback information.

Generally, data of a content video stored in the server storage unit 320 tend to be large due to various factors, including playing time, resolution, picture quality, contents, etc. If the data are large, transmission time, i.e., downloading time from the server 300 to the first display apparatus 100 increases and this may cause inconvenience to a user. Particularly, if a communication status in a network is of poor quality, the downloading time may be longer than if the communication status in the network is of good quality.

Accordingly, the server 300 may provide a preview image or highlight image of a content video. The preview image is generated by excerpting and editing a part of the entire content video and is provided for a user to roughly understand the content video. The preview image is generated by selecting a part of the entire playing section of the content video. A single section or a plurality of sections may be selected as the part of the entire playing section.

Generally, the preview image is generated according to a technique which involves editing and excerpting the content video by a provider providing the preview image, and thus, the preview image may not meet preferences of various users. Thus, according to the present exemplary embodiment, the following method is offered to improve upon this general technique.

The server 300, i.e., an apparatus which provides a content video, collects input feedback information corresponding to a playing timing or playing timings of the content video from one or more of the plurality of display apparatuses 100 and 200 connected to the server 300 through accounts, selects a part of the entire playing section of the content video based on the collected feedback information and generates a preview image of the content video. The server 300 provides the display apparatuses 100 and 200 with the preview image.

For purposes of convenience, accounts of the plurality of display apparatuses 100 and 200 are distinguished as the first account and the second account, which are related under predetermined conditions. The display apparatus 200 receives the content video from the server 300 and plays and displays the content video through the second account while being logged in the server 300. The display apparatus 200 receives feedback information corresponding to a predetermined playing timing of the content video from the outside, e.g., from a user. The display apparatus 200 transmits the feedback information to the server 300.

The server 300 stores the feedback information, which is transmitted by the display apparatus 200, corresponding to the playing timing. The server 300 generates a preview image based on various types of the feedback information transmitted by the display apparatus 200 through the account, and the feedback information may be categorized and selected depending on a correlation between the accounts.

For example, a plurality of user accounts may be categorized by predetermined categorization conditions, such as family, school, address, workplace, or fan clubs, and a user may be categorized according to his/her user profile. Also, the plurality of user accounts may be categorized by a method of setting categorization conditions by a single user with respect to other user accounts, such as registered friends, among the plurality of user accounts, as provided by a particular SNS provider. Such categorization is not limited to the foregoing examples, and the categorization conditions may vary.

The display apparatus 100 receives from the server 300 a preview image which is generated on the basis of the feedback information corresponding to a predetermined playing timing of the content video input by a user of another display apparatus 200 through the second account 201 while the display apparatus 100 is logged in the server 300 through the first account.

The display apparatuses 100 and 200 may receive the preview image from the server 300 while they are logged in the server 300 through their accounts, respectively. Thus, the preview image may meet various tastes of users, and furthermore, may reflect preferences of other users relating to a predetermined user, the other users being, for example, friends or family.

Figure 8:
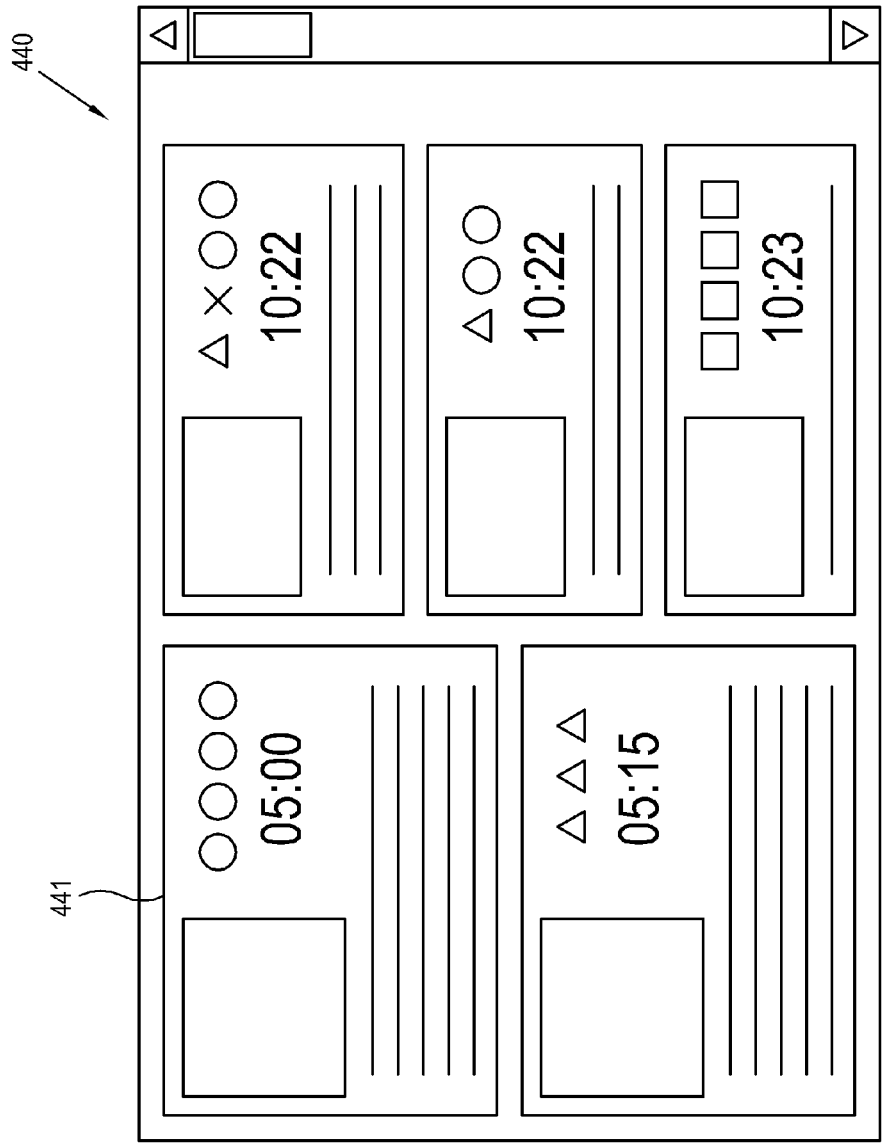
FIG. 8 illustrates an example of a web page image including feedback information provided by the server in FIG. 1.

FIG. 8 illustrates an example of a web page image 440 including the feedback information provided by the server 300.

As shown therein, the first display apparatus 100 may display a web page provided by the server 300 through a web browser. Upon receiving a signal requesting a web page of the feedback information from the first display apparatus 100 relating to a content video, the server 300 provides the web page image 440 including stored feedback information. The first display apparatus 100 displays the web page image 440 provided by the server 300.

The web page image 440 includes feedback information which is input through various accounts of display apparatuses and is related to the content video. The web page image 440 includes units of feedback information 441 which are input through the accounts.

Each of the units of feedback information 441 is feedback information input through an account of a single display apparatus at a certain playing timing of a content video. For example, the unit of feedback information 441 may include an account ID, user profile, playing timing corresponding to feedback information, or opinions or preferences input by a user.

A user may confirm various other users' opinions/preferences/other feedback on the content video through the web page image 440 displayed in the first display apparatus 100.

The server 300 may select feedback information which will be included in the web page image 440, among stored various feedback information, in the following manner. The server 300 categorizes the accounts based on the categorization conditions used with the SNS and categorizes feedback information input through the accounts according to the categorized accounts, as explained above. The server 300 may generate the web page image 440 including the categorized feedback information, and selectively provide content of the web page image 440 depending on whether the account which has requested the web page image 440 belongs to a certain account category.

Alternatively, the server 300 may generate a preview image from the content video based on the categorized feedback information, and this will be described with reference to FIG. 9.

Figure 9:
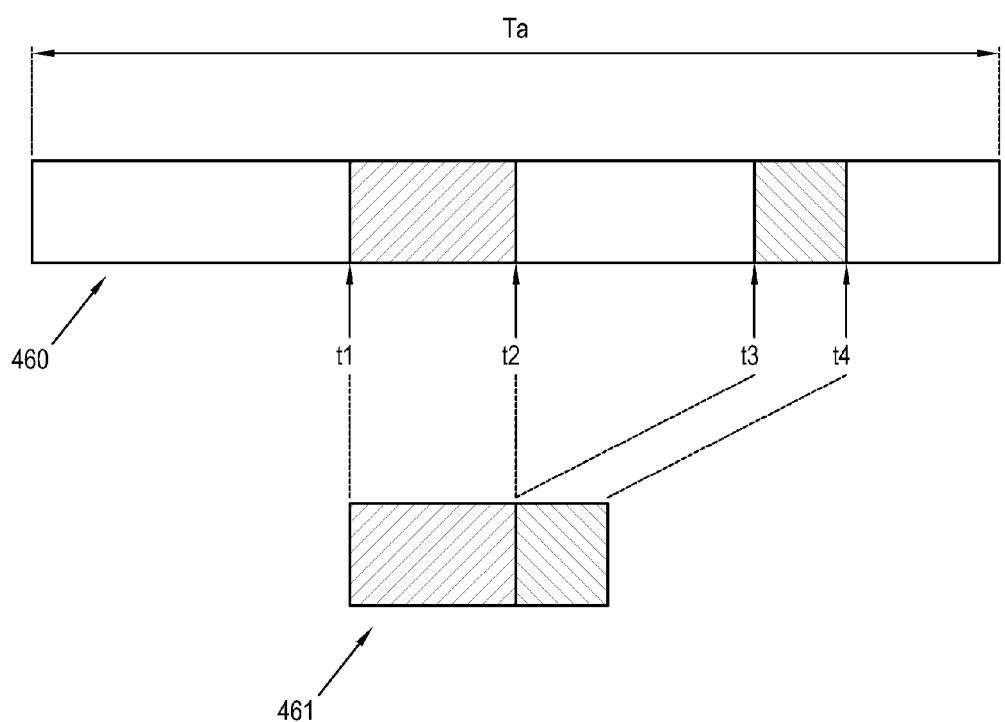
FIG. 9 illustrates a method of generating a preview image from a content video by the server in FIG. 1.

FIG. 9 illustrates an example of a method of generating a preview image 461 by the server 300 from the content video 460.

In FIG. 9, an entire playing section (i.e., the entire length) of the content video 460 is indicated as Ta. The timing corresponding to the feedback information is located at a location in the entire playing section Ta.

The server 300 determines a degree of distribution of the playing timing corresponding to the feedback information with respect to Ta. The server 300 extracts playing sections which are determined to have the highest degree of distribution of the playing timing corresponding to the feedback information among Ta, e.g., the playing section from t1 to t2 and the playing section from t3 to t4.

The method of determining the degree of distribution may employ various mathematical or statistical algorithms, and a detailed explanation thereof will be omitted.

The server 300 generates the preview image 461 based on the extracted sections from t1 to t2 and from t3 to t4.

The preview image 461 is generated on the basis of feedback information transmitted by the accounts within an account category that is determined to be relevant. Then, if a user of an account within the same relevant account category transmits a request for the preview image 461, the server 300 provides the preview image 461 to the account corresponding to the same relevant account category.

Thus, a user may receive the preview image 461 which reflects his/her various preferences/tastes.

Figure 10:
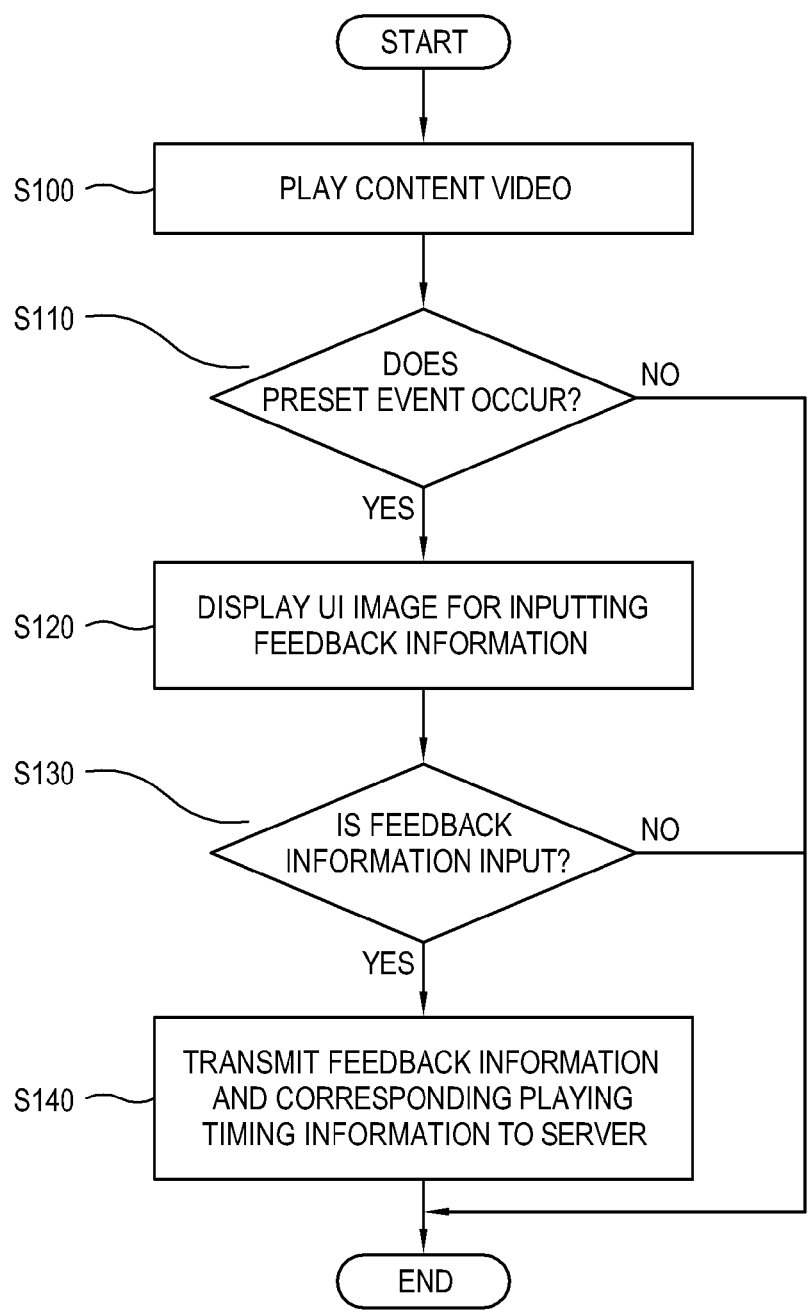
FIG. 10 is a control flowchart showing a method of inputting feedback information according to an exemplary embodiment.

Hereinafter, a method of inputting feedback information of a content video by a second display apparatus according to the present exemplary embodiment will be described with reference to FIG. 10. FIG. 10 is a control flowchart showing a method of inputting feedback information, according to an exemplary embodiment. In this exemplary embodiment, a case where the second display apparatus 200 is logged in a server 300 through a second account is an initial state.

As shown therein, the second display apparatus plays a content video at operation S100. Upon the occurrence of a preset event while the content video is played at operation S110, the second display apparatus displays a UI image for inputting feedback information, together with the content video at operation S120.

If the feedback information is input through the UI image at operation S130, the second display apparatus transmits the input feedback information and corresponding playing timing information to the server at operation S140.

Then, the server stores therein the feedback information and playing timing information corresponding to the second account.

Figure 11:
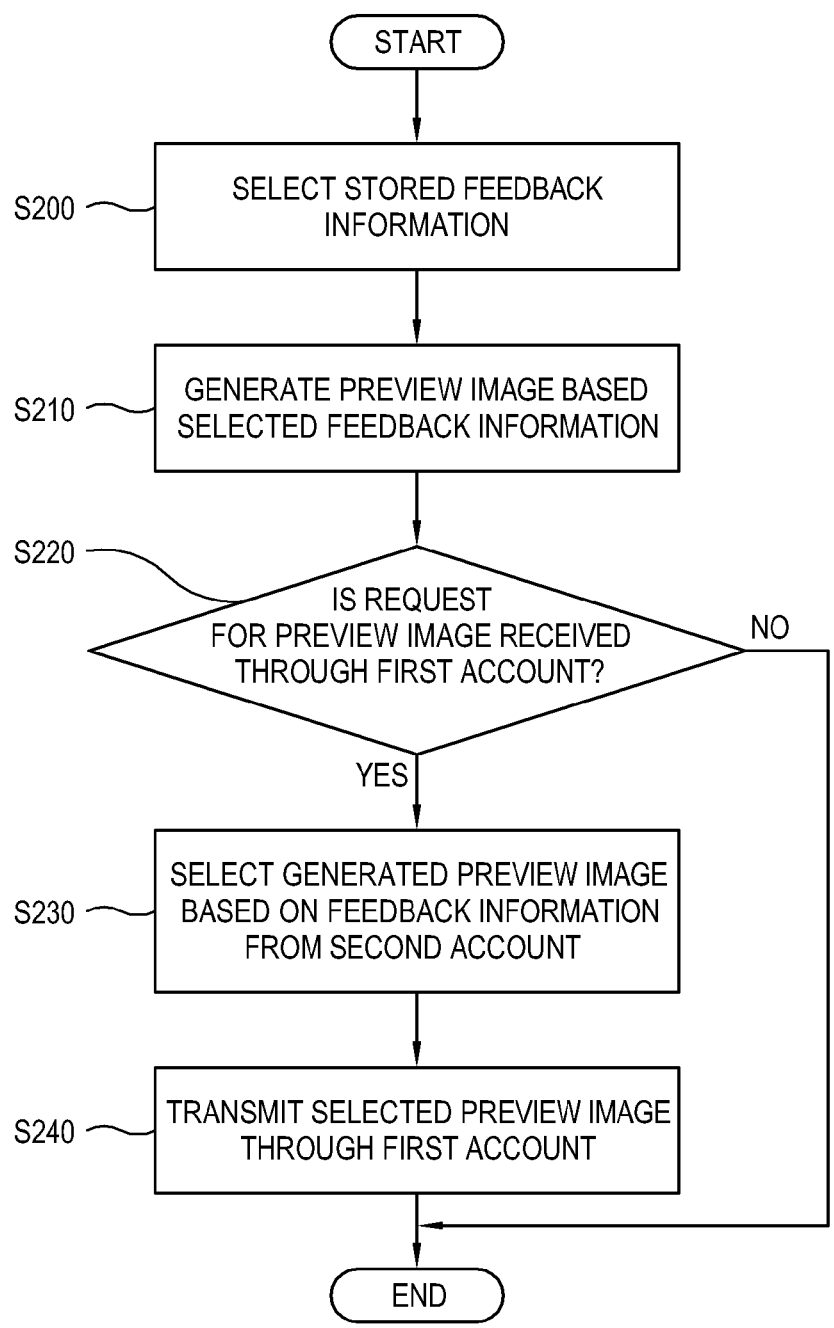
FIG. 11 is a control flowchart showing a method of generating a preview image by a server according to an exemplary embodiment.

Hereinafter, a method of generating a preview image by the server according to the present exemplary embodiment will be described with reference to FIG. 11. FIG. 11 is a control flowchart showing a process of generating a preview image according to an exemplary embodiment. In this exemplary embodiment, a case where the first display apparatus 100 is logged in the server 300 through the first account is an initial state.

As shown therein, the server selects the stored feedback information at operation S200. The selection method may be the same as that explained above, and the server generates the preview image based on the selected feedback information at operation S210.

Upon receiving a request for the preview image from the first display apparatus through the first account at operation S220, the server selects the preview image generated on the basis of the feedback information from the second account at operation S230. The reason why the server selects the preview image generated on the basis of the feedback information from the second account is because the first account is determined to be related to the second account based on preset conditions.

The server transmits the selected preview image to the first display apparatus with the first account at operation S240. Accordingly, the first display apparatus may display the preview image reflecting the feedback information from the second account that is related to the first account.

As described above, the display apparatus according to the present exemplary embodiment (e.g., first display apparatus 100) may be connected to a server (e.g., server 300) through a first account (e.g., first account 101), and the server 300 may be connected to another display apparatus (e.g., second display apparatus 200) with at least one second account (e.g., second account 201) that is set to be related to the first account based on predetermined conditions. Upon a connection to the server through the first account, the display apparatus may receive the preview image from the server which has been generated by the server on the basis of the feedback information corresponding to a predetermined playing timing of the content video and input by the other display apparatus with the second account.

Further, according to exemplary embodiments, the server may receive the feedback information from the plurality of display apparatuses which is input corresponding to a predetermined playing timing of the content video, generate the preview image based on the feedback information if the accounts are set to be related to each other based on predetermined conditions, and provide the preview image to the display apparatuses.

The predetermined conditions may be many different types of conditions and are not limited, as long as the predetermined conditions define some kind of relevance between preset accounts. For example, the relevance may be based on a category (e.g., friends) which is provided by the SNS.

Figure 12:
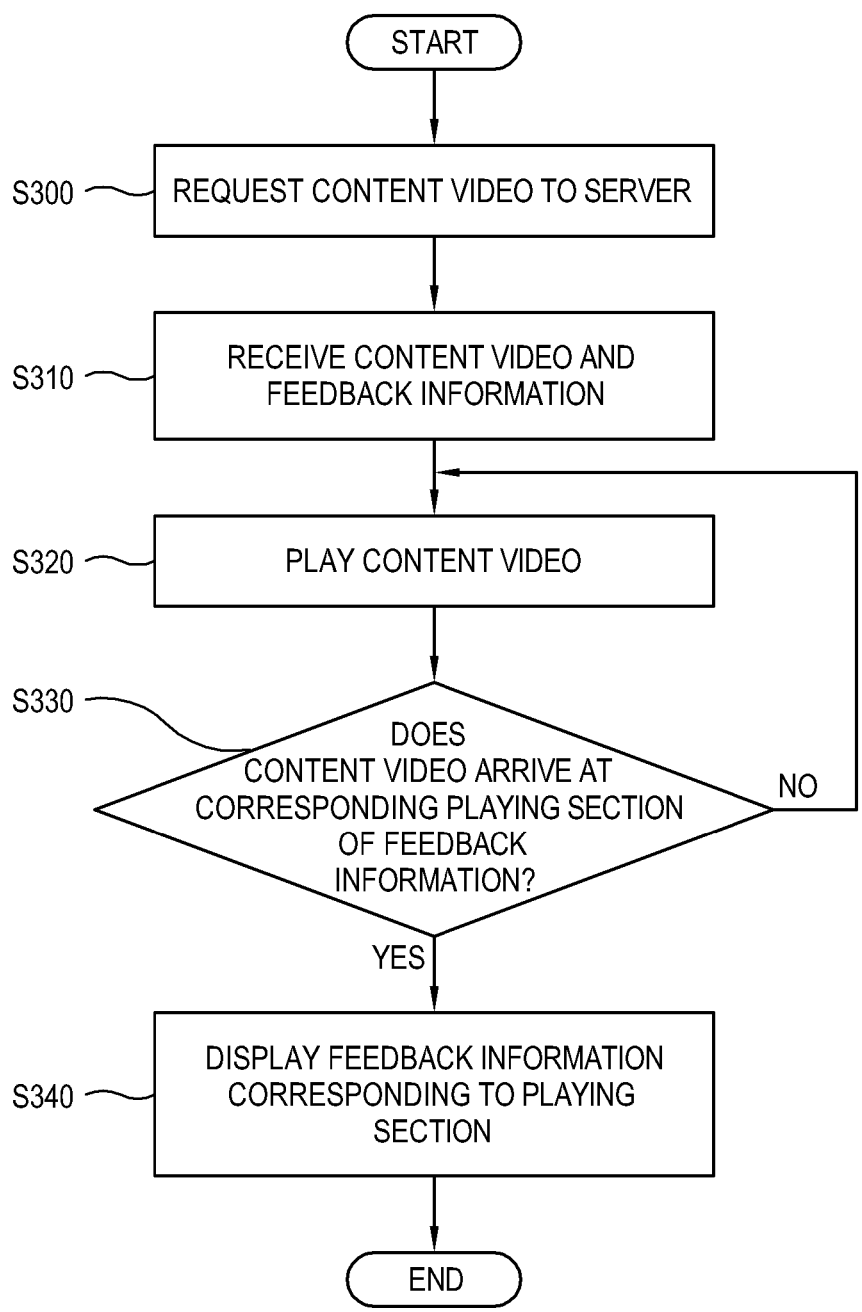
FIG. 12 is a control flowchart showing a method of displaying feedback information according to an exemplary embodiment.

Hereinafter, a control method of the display apparatus according to the present exemplary embodiment will be described with reference to FIG. 12. FIG. 12 is a control flowchart showing a method of displaying feedback information according to an exemplary embodiment.

As shown therein, the display apparatus transmits a request for the content video to the server at operation S300. In response to such a request, the display apparatus receives the content video and feedback information related to the content video from the server at operation S310.

The display apparatus plays the received content video at operation S320.

If the content video arrives at the corresponding playing timing of the feedback information while the content video is being played at operation S330, the display apparatus displays the feedback information corresponding to the playing timing at operation S340. The feedback information may be overlaid on the content video, and the display apparatus does not display the feedback information if the content video is played past the playing timing.

The foregoing process is repeatedly performed when there is a playing timing corresponding to various types of feedback information while the content video is played.

Although a few exemplary embodiments have been shown and described, it will be appreciated by those skilled in the art that changes may be made in these exemplary embodiments without departing from the principles and spirit of the invention, the range of which is defined in the appended claims and their equivalents.

What is claimed is:

1. A system comprising:
a server configured to provide a social networking service (SNS); and
a display apparatus configured to communicate with the server,
the display apparatus comprising:
a display unit configured to display a content video thereon;
a communication unit configured to communicate with the server; and
a controller configured to receive from the server a plurality of feedback information of the content video based on feedback information of a plurality of users with respect to the content video, the plurality of the feedback information being collected through the SNS, and configured to provide the plurality of the feedback information while the content video is played,
wherein the plurality of the feedback information is configured to respectively correspond to playing timings in an entire playing time of the content video, and
wherein the server is configured to select a playing section from an entire playing section of the content video based on a degree of distribution of the playing timings respectively corresponding to the plurality of the feedback information in the entire playing time, and the controller is configured to display a preview video including the selected playing section on the display unit.

2. The system according to claim 1, wherein the controller displays first feedback information of the plurality of the feedback information when the content video arrives at a first playing timing in the entire playing time while the content video is played, the first feedback information configured to correspond to the first playing timing, and overlays feedback information of one of the users on the content video corresponding to a part of a playing section in response to the display unit starting to display the part of the playing section.

3. The display apparatus according to claim 1, wherein the feedback information comprises at least one from among preferences, opinions, content information and bookmark information of a predetermined playing section of the content video.

4. The display apparatus according to claim 1, wherein the controller controls the display unit to display a user interface (UI) image which is provided to input feedback information of the content video while the content video is played, and upon receiving the feedback information through the UI image in a predetermined playing section of the content video, transmits to the external server the feedback information so that the external server stores the feedback information regarding the predetermined playing section at which the feedback information has been input.

5. The display apparatus according to claim 1, wherein the controller is connected to the external server through a user account based on the SNS.

6. An apparatus for providing a content video comprising:
a storage unit configured to store a content video therein;
a communication unit configured to connect to a plurality of display apparatuses for communication based on a social networking service (SNS); and
a controller configured to collect a plurality of feedback information of a plurality of users regarding the content video from the plurality of display apparatuses, the plurality of the feedback information being collected through the SNS, and configured to provide one of the display apparatuses with the collected feedback information of the plurality of users together with the content video while the content video is played,
wherein the plurality of the feedback information is configured to respectively correspond to playing timings in an entire playing time of the content video, and
wherein the controller is configured to select a playing section from an entire playing section of the content video based on a degree of distribution of the playing timings respectively corresponding to the plurality of the feedback information in the entire playing time, and the controller is configured to transmit a preview video including the selected playing section to the display apparatus to be displayed.

7. The apparatus according to claim 6, wherein the controller provides the display apparatus with information of a part of a playing section corresponding to feedback information to overlay the feedback information on the content video in response to the display apparatus starting to display the part of the playing section.

8. The apparatus according to claim 6, wherein the plurality of feedback information comprises at least one from among preferences, opinions, content information and bookmark information of a predetermined playing section of the content video.

9. The apparatus according to claim 6, wherein the display apparatus is connected to the apparatus through a user account based on the SNS.

10. A control method of a system including a server and a display apparatus comprising:
by the display apparatus, connecting to the server providing a social networking service (SNS) for communication;
by the display apparatus, receiving from the server a plurality of feedback information of a content video based on feedback information of a plurality of users, the plurality of the feedback information being collected through the SNS; and
providing the plurality of the feedback information while the content video is played,
wherein the plurality of the feedback information is configured to respectively correspond to playing timings in an entire playing time of the content video, and
wherein the providing comprises:
by the server, selecting a playing section from an entire playing section of the content video based on a degree of distribution of the playing timings respectively corresponding to the plurality of the feedback information in the entire playing time; and
by the display apparatus, displaying a preview video including the selected playing section.

11. A control method of an apparatus for providing a content video comprising:
connecting to a plurality of display apparatuses for communication based on a social networking service (SNS);
collecting a plurality of feedback information of a plurality of users regarding a content video from the plurality of display apparatuses, the plurality of feedback information being collected through the SNS; and
providing one of the display apparatuses with the collected feedback information of the plurality of users, together with the content video, to display the feedback information while the content video is played,
wherein the plurality of the feedback information is configured to respectively correspond to playing timings in an entire playing time of the content video, and wherein the providing comprises:
- selecting a playing section from an entire playing section of the content video based on a degree of distribution of the playing timings respectively corresponding to the plurality of the feedback information in the entire playing time; and
- transmitting a preview video including the selected playing section to the display apparatus to be displayed.

12. The system according to claim 1, wherein the server selects the playing section which is determined to have the degree of distribution higher than a predetermined degree level.

* * * * *